United States Patent
Niemelä

(10) Patent No.: US 7,769,991 B2
(45) Date of Patent: Aug. 3, 2010

(54) AUTOMATICALLY EXECUTING AN ANTI-VIRUS APPLICATION ON A MOBILE COMMUNICATIONS DEVICE

(75) Inventor: Jarno Niemelä, Espoo (FI)

(73) Assignee: F-Secure Oyj, Helsinki (FI)

( * ) Notice: Subject to any disclaimer, the term of this patent is extended or adjusted under 35 U.S.C. 154(b) by 727 days.

(21) Appl. No.: 11/712,554

(22) Filed: Mar. 1, 2007

(65) Prior Publication Data

US 2007/0214351 A1 Sep. 13, 2007

(30) Foreign Application Priority Data

Mar. 2, 2006 (GB) .................... 0604165.1

(51) Int. Cl.
*G06F 15/177* (2006.01)
(52) U.S. Cl. ................ 713/1; 713/2; 713/100; 726/24
(58) Field of Classification Search ........ 713/1; 726/24
See application file for complete search history.

(56) References Cited

U.S. PATENT DOCUMENTS

| | | | | |
|---|---|---|---|---|
| 5,559,960 | A * | 9/1996 | Lettvin | 726/24 |
| 6,802,028 | B1 * | 10/2004 | Ruff et al. | 714/38 |
| 7,591,018 | B1 * | 9/2009 | Lee | 726/24 |
| 2007/0106630 | A1 * | 5/2007 | Fitzgerald et al. | 707/1 |
| 2007/0214453 | A1 * | 9/2007 | Dive-Reclus | 717/175 |

FOREIGN PATENT DOCUMENTS

| | | |
|---|---|---|
| GB | 2 366 693 | 3/2002 |
| GB | 2 378 783 | 2/2003 |
| WO | 2006/038082 | 4/2006 |

OTHER PUBLICATIONS

UK Search Report for GB0604165.1 date of search Jul. 4, 2006.
Siemens Community Forums: Autorun for an MMC card Slot, http://agathonisi.erlm.siemens.de:8080/jive3/thread.jspa?threadID=15295, last post: Sep. 16, 2004, 2 pages.
Symbian Programming—Starting applications automatically, http://web.archive.org/web/20041027013137/http://www.cs.helsinkii.fi/u/mraento/Symbian/autostart.html, 2 pages, 2004.
Symbian: Recognizers Overview; http://www.symbian.com/developer/techlib/v70docs/sdl_v7.0/doc_source/devguides/cpp/applicationframework/recognizersoverview.guide.html, 2 pages, 2002.

* cited by examiner

Primary Examiner—Nitin C Patel
(74) Attorney, Agent, or Firm—Nixon & Vanderhye P.C.

(57) ABSTRACT

There is provided a method and apparatus for executing an anti_virus application on a mobile communications device. A memory card for coupled to a mobile communications device, and a boot sequence is initiated on the mobile communications device. Prior to completion of the boot sequence, a Symbian recognizer is loaded to the communications device from the memory card. The loaded Symbian recognizer is executed on the mobile communications device to automatically execute an anti-virus application, the anti-virus application also being stored on the memory card.

8 Claims, 2 Drawing Sheets

AUTOMATICALLY EXECUTING AN ANTI-VIRUS APPLICATION ON A MOBILE COMMUNICATIONS DEVICE

FIELD OF THE INVENTION

The present invention relates to methods and apparatus for executing an application on a mobile communications device, and in particular, though not necessarily, to methods and apparatus for executing an anti-virus application on a mobile communications device.

BACKGROUND

Software viruses are an increasing problem for mobile communications device users. The term 'virus' is used herein to describe malware such as worms, viruses and trojans. Mobile communications device viruses can be spread between devices via data communication channels such as IMS, GPRS, MMS and Bluetooth™. For example, the Cabir worm infects mobile communications devices that use the Symbian based Series 60 user interface platform. The worm is packed in a Symbian installation file (.sis) and tries to spread to other mobile communications devices over Bluetooth. When installed in a communications device, the worm activates automatically and starts looking for other devices that use Bluetooth. Once Bluetooth communications devices in discoverable mode are found, the worm tries to replicate by sending a copy of itself to them. The worm activates itself if the user of the receiving communications device chooses to accept and install the received file named caribe.sis, which contains the worm. A person with an infected communications device could plausibly infect thousands of others simply by walking through a city centre during a busy afternoon.

The symptoms of mobile communications device viruses vary. For example, a virus could cause an infected communications device to send undetected premium rate text messages. A virus infection can also result in a total loss of data stored on a mobile communications device, which may include valuable contact information. In a worst-case scenario, the virus may cause a large number of users considerable damage by creating telecommunication charges, flooding the mobile operator's network with disruptive traffic and completely disabling mobile communications devices.

The damage caused by mobile communications device virus incidents includes terminal downtime, negative customer experience, slow service adoption, bad publicity, and increase the support load required of the service provider. The possibility of virus threats on mobile devices is increasing as more advanced handheld devices are introduced to the market. Unintentional vulnerabilities in mobile devices are causing more and more problems.

Anti-virus software for mobile communications devices is available, e.g. F-Secure® Mobile Anti-Virus (F-Secure Corporation, Helsinki, Finland). However, many users do not take advantage of anti-virus software and so are not protected against infection by a virus. In the case of an unprotected device, when a user's mobile device has become infected, the user will typically take the device to a mobile telephone repair shop or other service point. The communications device is often turned off when the user brings it into a mobile telephone repair shop. Typically, the first thing that a person attempting to repair the device will do is turn the device on. When the communications device is turned on at the repair shop it can start spreading the virus before any anti-virus or disinfection software has been installed and operated. For example, a worm such as Cabir can connect to other Bluetooth communications devices and spread further before the worm is removed.

SUMMARY

According to a first aspect of the invention, there is provided a method for automatically executing an anti-virus application on a mobile communications device, the mobile communications device using a Symbian operating system, the method comprising:
  coupling a memory card to the mobile communications device;
  initiating a boot sequence on the mobile communications device;
  prior to completion of the boot sequence, loading to the mobile communications device a Symbian recognizer from the memory card;
  executing the loaded Symbian recognizer on the mobile communications device to automatically execute an anti-virus application, the anti-virus application also being stored on the memory card.

It is preferred that the memory card is selected from one of a MultiMedia; CompactFlash; Secure Digital; Mini-SD; Memory Stick; and SmartMedia.

The memory card may be coupled to the mobile communications device prior to turning on power for the mobile communications device.

According to a second aspect of the present invention, there is provided a memory card for connecting to a mobile communications device, the memory card comprising data storage means having stored thereon:
  an anti-virus application for executing on the mobile communications device;
  a Symbian recognizer component for automatically executing the application when the memory card is coupled to the mobile communications device, prior to completion of a boot sequence of the mobile communications device.

The memory card may further comprise means for installing anti-virus software on the mobile communications device, in order to ensure that the anti-virus software will run in the mobile communications device without the need to coupling the memory card to the mobile communications device.

It is preferred the memory card is selected from MultiMedia; CompactFlash; Secure Digital; Mini-SD; Memory Stick; and SmartMedia.

According to a third aspect of the invention, there is provided a method for removing a virus from a mobile communications device, the mobile communications device having a Symbian operating system, the method comprising;
  inserting a memory card into the mobile communications device, the memory card comprising a Symbian recognizer and an anti-virus application; and
  initiating a boot sequence on the mobile communications device, whereupon the Symbian recognizer executes the anti-virus software on the mobile communications device to remove the virus from the mobile communications device before other applications start up.

According to a fourth aspect, there is provided a method for disabling malware on, or removing malware from, a mobile communications device, the method comprising:
  coupling a memory card to the mobile communications device;
  initiating a boot sequence on the mobile communications device;

prior to completion of the boot sequence, loading to the mobile communications device a Symbian recognizer from the memory card;

executing the Symbian recognizer on the mobile communications device, the Symbian recognizer being arranged to disable or remove the malware

BRIEF DESCRIPTION OF THE FIGURES

The invention will now be described with reference to the accompanying drawings, in which.

DETAILED DESCRIPTION

Figure 1:
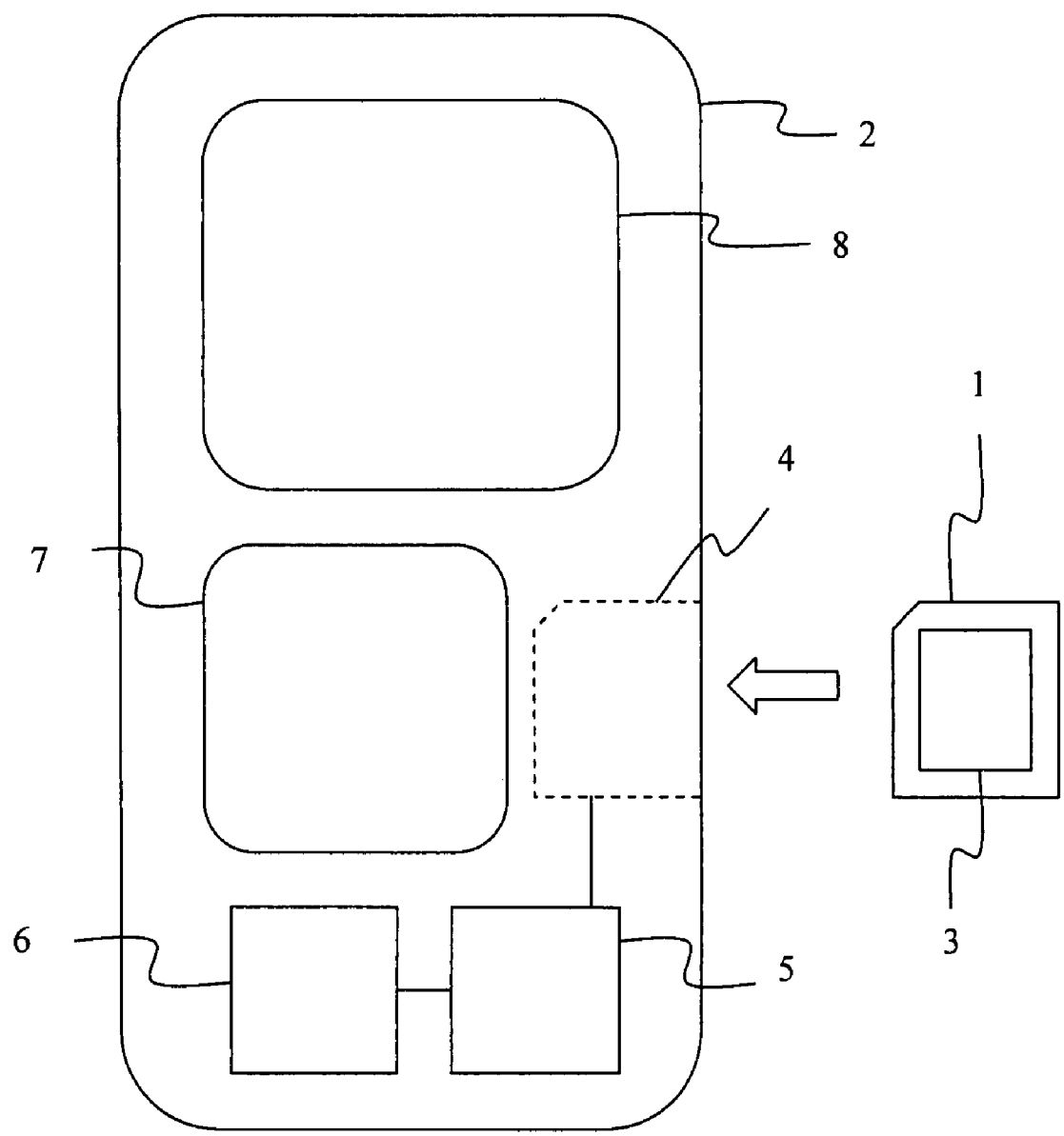
FIG. 1 illustrates schematically a mobile communications device and a memory card.

Referring to FIG. 1, a memory card 1, for insertion in a mobile communications device 2 with a Symbian operating system, has data storage 3 containing a customized Symbian recognizer component and an anti-virus application. The mobile communications device 2 comprises an interface 4 for coupling to the memory card 1, a microprocessor 5, a memory 6, a user input device 7 and a display 8.

Symbian is a standard operating system used by many mobile communication devices (see http://www.symbian.com), although other mobile communications device operating systems are also in use. Symbian recognizers are described in further detail at http://www.symbian.com/developer/techlib/v70docs/sdl_v7.0/doc_source/devguides/cpp/applicationframework/recognizersoverview.guide.html Memory cards are available in different formats, including MultiMedia™ (MMC), CompactFlash™ (CF), Secure Digital™ (SD), Mini-SD™, Memory Stick™, and SmartMedia®. The MMC card is commonly used with mobile communications devices owing to having a size advantage over other forms of memory cards and low power draw, which makes it suitable for battery powered mobile communications devices. MMC cards are normally used for storing data such as video, photographs, ring-tones, music and so on.

The Symbian recognizer component is software stored in a special directory, namely "system\recogs". Symbian recognizers are dynamic link library (dll) files and are used to handle certain kinds of documents or files. Recognizers are loaded when the device boots up, and so it is possible to embed code into a recognizer to execute an application. In conventional mobile communications devices, Symbian recognizers are stored on the mobile communications device itself, and it is recommended that if a Symbian recognizer is used to execute an application, it should not do so until the mobile communications device has booted completely. This is because not all services are yet available when the recognizers are loaded. Normal practice is to wait until either one of the system applications has started before executing another application from the recognizer stored on the communications device, or by programming the recognizer to wait for a predetermined time delay before executing an application.

On the other hand, in the present invention, a recognizer is stored in a "system\recogs" directory on the memory card 1. The recognizer executes automatically when the device 2 with the MMC card 1 inserted is booted. The recognizer executes the anti-virus software stored on the MMC card 1 to disinfect the mobile communications device 2. The recognizer executes very early on in the Symbian OS boot sequence, which executes recognizers stored on the mobile communications device 2 before executing a recognizer stored on the memory card 1. The Symbian OS looks for recognizers and executes them before starting any other applications.

Alternatively, if the device 2 is already turned on, the recognizer executes automatically when the MMC card 1 is inserted into the device 2.

Figure 2:
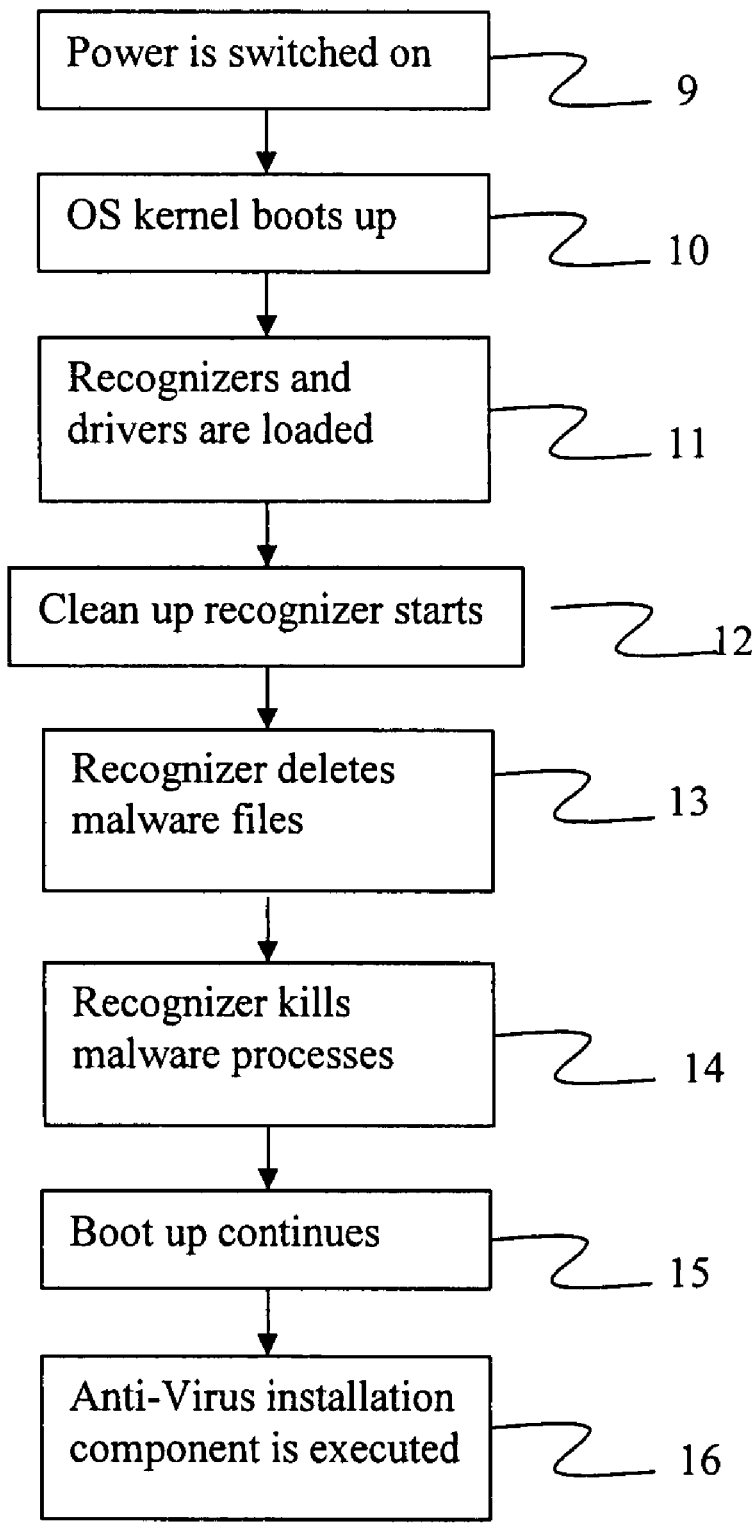
FIG. 2 is a flow diagram showing the disinfection sequence from turning on the mobile communications device.

Referring to FIG. 2, when the device is switched on 9, the OS kernel boots up 10. No modification to the Symbian OS is necessary, as recognizers are loaded by the Symbian OS before starting any other applications. When the recognizer is started 12, it executes the anti-virus component. The anti-virus component performs step 13 of deleting malware files, and a further step 14 of stopping any running malware processes. The anti-virus component searches for viruses such as Cabir, Commwarrior, Mabir, Skulls, Locknut etc and deletes their binaries, thus disinfecting the mobile communications device. The order of steps 13 and 14 can be changed, for example the step 14 of stopping any running malware processes may be carried out before the step 13 of deleting malware files. Furthermore, where the step 14 of stopping any running malware processes is followed by the step 13 of deleting malware files, the step 14 of stopping any running malware processes may be repeated.

The boot up continues 15, and the Symbian recognizer may, in addition to executing an anti-virus component to remove viruses, install 16 anti-virus software onto the mobile communications device to reduce the likelihood that the mobile communications device will become infected in the future.

It will be appreciated by those of skill in the art that various modifications may be made to the above-described embodiments without departing from the scope of the present invention. For example, the above description discloses the invention with respect to MMC cards. However, the invention may also use other types of memory card. Furthermore, it is envisaged that the invention may be used with future versions of the Symbian Operating System. Whilst the above description refers to the Symbian recognizer being used to execute, and optionally install, an anti-virus application on a mobile communications device, the person skilled in the art will realise that the Symbian recognizer may be programmed directly to disinfect the mobile communications device prior to installing an anti virus application on the mobile communications device, by removing any malware files found on the mobile communications device and/or by stopping any running malware processes.

The invention claimed is:

1. A method for automatically executing an anti-virus application on a mobile communications device, the mobile communications device use a Symbian operating system, the method comprising:

coupling a memory card to the mobile communications device;

initiating a boot sequence on the mobile communications device;

prior to completion of the boot sequence, loading to the mobile communications device a Symbian recognizer from the memory card; and executing the loaded Symbian recognizer on the mobile communications device to automatically execute an anti-virus application, the anti-virus application also being stored on the memory card.

2. A method for automatically executing an anti-virus application on a mobile communications device according to claim 1, wherein the memory card is selected from one of a MultiMedia; CompactFlash; Secure Digital; Mini-SD; Memory Stick; and SmartMedia.

3. A method for automatically executing an anti-virus application on a mobile communications device according to claim 1, further comprising coupling the memory card to the mobile communications device prior to turning on power for the mobile communications device.

4. A memory card for connecting to a mobile communications device, the memory card comprising data storage means having stored thereon:
- an anti-virus application for executing on the mobile communications device; and
- a Symbian recognizer component for automatically executing the application when the memory card is coupled to the mobile communications device, prior to completion of a boot sequence of the mobile communications device.

5. A memory card as claimed in claim 4, further comprising installation means for installing the anti-virus application on the mobile communications device.

6. A memory card as claimed in claim 4, wherein the memory card is selected from MultiMedia; CompactFlash; Secure Digital; Mini-SD; Memory Stick; and SmartMedia.

7. A method for removing a virus from a mobile communications device, the mobile communications device having a Symbian operating system, the method comprising:

inserting a memory card into the mobile communications device, the memory card storing a Symbian recognizer and an anti-virus application; and initiating a boot sequence on the mobile communications device, whereupon the Symbian recognizer executes the anti-virus application on the mobile communications device to remove the virus from the mobile communications device before other applications start up.

8. A method for disabling malware on, or removing malware from, a mobile communications device, the method comprising:

coupling a memory card to the mobile communications device;

initiating a boot sequence on the mobile communications device;

prior to completion of the boot sequence, loading to the mobile communications device a Symbian recognizer from the memory card; and executing the Symbian recognizer on the mobile communications device, the Symbian recognizer being arranged to disable or remove the malware.

* * * * *